(12) United States Patent
Trevisani

(10) Patent No.: US 8,915,056 B2
(45) Date of Patent: Dec. 23, 2014

(54) SUPPORTING AND GUIDING DEVICE FOR FEEDING LINES FOR DIGGING TOOLS

(75) Inventor: Davide Trevisani, Cesena (IT)

(73) Assignee: Soilmec S.p.A., Cesena (FC)

( * ) Notice: Subject to any disclaimer, the term of this patent is extended or adjusted under 35 U.S.C. 154(b) by 0 days.

(21) Appl. No.: 13/616,605

(22) Filed: Sep. 14, 2012

(65) Prior Publication Data

US 2013/0087646 A1    Apr. 11, 2013

(30) Foreign Application Priority Data

Sep. 16, 2011 (IT) ............................... TO2011A0832

(51) Int. Cl.
*F16G 13/00* (2006.01)
*H02G 3/04* (2006.01)
*B66D 1/36* (2006.01)
*E02D 7/16* (2006.01)

(52) U.S. Cl.
CPC .. *B66D 1/36* (2013.01); *E02D 7/16* (2013.01); Y10S 59/90 (2013.01)
USPC ................................ 59/78.1; 59/900; 248/49

(58) Field of Classification Search
CPC ........................................................ F16G 13/16
USPC ................................. 59/78.1, 900; 248/49, 51
See application file for complete search history.

(56) References Cited

U.S. PATENT DOCUMENTS

| | | | | |
|---|---|---|---|---|
| 5,134,251 A | * | 7/1992 | Martin | 174/136 |
| 6,156,974 A | * | 12/2000 | Blase | 174/68.3 |
| 6,374,589 B1 | * | 4/2002 | Kunert et al. | 59/78.1 |
| 7,272,922 B2 | * | 9/2007 | Fahrion | 59/2 |
| 7,845,154 B2 | | 12/2010 | Arzberger et al. | |
| 7,845,155 B2 | * | 12/2010 | Jaeker | 59/78.1 |
| 2005/0056333 A1 | * | 3/2005 | Utaki | 138/120 |

FOREIGN PATENT DOCUMENTS

| | | |
|---|---|---|
| DE | 44 26 598 C1 | 12/1995 |
| EP | 0 518 292 A1 | 12/1992 |
| EP | 1 498 650 A1 | 1/2005 |

OTHER PUBLICATIONS

Authorized officer Harald Geiger, Search Report in IT TO20110832, Jun. 25, 2012, 2 pages.

* cited by examiner

*Primary Examiner* — David B Jones
(74) *Attorney, Agent, or Firm* — Fish & Richardson P.C.

(57) ABSTRACT

A device for supporting and guiding supplying lines used with a digging tool on a drilling machine is described. The device comprises a support branch, formed by a plurality of spacers, adjacent to one another in which a rope or tie-rod is inserted in a housing comprised in the spacers, a supplying pipe for the supplying line and a crosspiece comprising a seat adapted to support the supplying pipe. Each pair of adjacent spacers comprises retaining means. Each retaining means comprises a retaining element, associated to a first spacer of a pair of adjacent spacers, and a slot having a shape substantially matching the shape of the retaining element, associated to a second spacer of the pair of adjacent spacers. A retaining element, during use, engages with a slot allowing relative axial movement, in the longitudinal direction of the rope, of a predetermined amount.

15 Claims, 14 Drawing Sheets

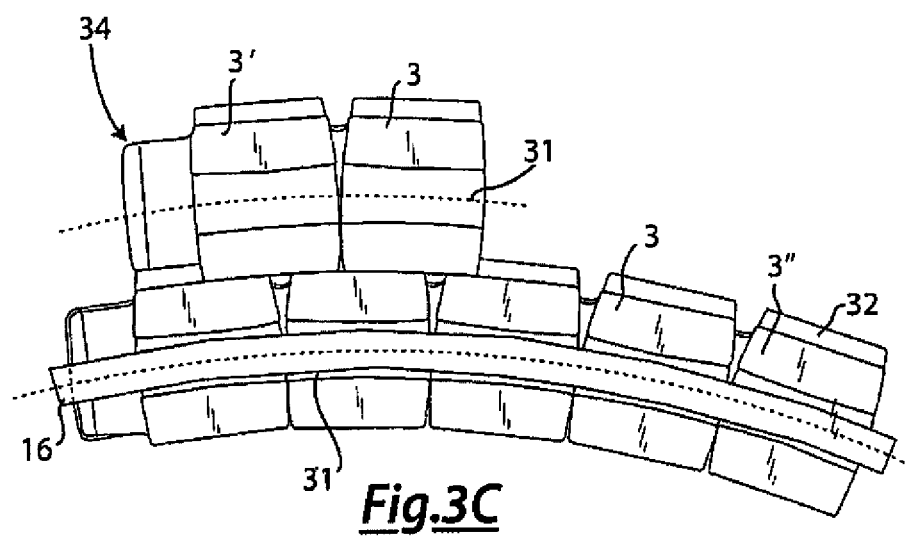

SUPPORTING AND GUIDING DEVICE FOR FEEDING LINES FOR DIGGING TOOLS

Under 35 U.S.C. §119, this application claims the benefit of a foreign priority application filed in Italy, serial number TO2011 A 000832, filed Sep. 16, 2011.

The present invention refers to a device for supporting and guiding supplying lines, for example made up of hydraulic oil circuits and/or of the possible electrical equipment, for a digging device, to be mounted, preferably, on a crane, rope excavators or drilling machine, for making diaphragms or screens in the ground.

It is known that, in the field of drilling in the ground, in particular that of diaphragms, usually digging devices are used that move by means of a rope lifting device.

In the case of hydromills, which are machines that are normally used to make diaphragms, it is necessary to move a series of supplying lines, like for example hydraulic oil pipes, cables for the electrical equipment and the control, generally also inserted inside hydraulic pipes, or in any case, equipped with constructive provisions so as to be compatible with the construction site.

Said pipes and cables, are wound around a drum of a winder which, when rotating, collects or unwinds them, according to the necessary movements required by the excavation.

For great depths, indicatively deeper than 100 m, the length and the weight of the pipes have considerable values, making it necessary for them to be guided and supported, both to prevent them from becoming entangled during ascent and descent in the excavation, and to prevent an excessive pulling force, generated by their own weight, from creating excessive stretching of the pipes and cables, causing them, in some cases, to unwonted break. Indeed, if said pipes and cables are too elastic, they do not allow the movement system to be able to react promptly to the winding and unwinding commands, given by the drum of the winch, causing problems to the correct winding.

Moreover, again due to their weight, when said pipes are wound around the drum of the winch, every loop of pipe undergoes strong pressure, generated by the weight of all the following loops, on top of it.

This ensures that the innermost loop, the one wound directly on the drum with the shortest diameter, is the one subjected to great pressures.

In order to allow a fast winding, it is not always possible to make pipes that can withstand said pressures.

It is therefore necessary to provide for constraining said pipes to one another, so that they can be wound in a tidy manner, without suffering structural damage, such as crushing, guiding them in a way such as to avoid entangling of the pipes and/or cables themselves when moved.

It is known, from European patent EP0518292, for there to be a digging device, for example a hydromill, in which the pipes, for the supplying lines, are kept separated from one another, in a parallel manner, by transversal bars that are fixed along the pipes, at regular intervals; said bars are kept at the right distance by suitably shaped spacers, creating two support branches.

The ends of the bars and the shaped spacers are passed through by a rope for each branch.

In order to avoid that the spacer elements, wound in the drum, become misaligned, they are equipped with a tooth and with a slot, having a matching shape, so as to couple perfectly when they are wound around the drum.

Every shaped spacer, already wound on the drum carries out a guiding function, through the direct coupling between its tooth and the corresponding slot of the spacer which is wound on the drum itself; the latter, in turn, carries out a guiding function for the following one that is wound.

When the pipes are laid out inside the excavation, the entire weight of the pipes and of the spacer elements bears down completely on the two lateral ropes.

When the weight, weighing down on the ropes, becomes considerable as the digging goes on, it can cause the progressive stretching of the ropes themselves, to the point in which the shaped spacers bundle together, indeed due to their weight, towards the bottom.

In this condition, since the spacer elements are no longer guided, they can rotate around the axis of the rope and they can even be arranged in anomalous positions.

The rotation of said spacer elements can be caused by the vibrations which are always present when digging, or due to the simple movement of the drilling machine or tool.

The rotation of the spacer elements is essentially due to their shape; indeed, said elements have the shape of a parallelepiped without any axial symmetry, thus undergoing twisting moments.

Following the rotation of one or more spacer elements, when the pipes are rewound on the drum, it is possible for them to get stuck on the return sheave, thus preventing the rewinding of the pipes themselves.

Similarly, in the section going from the drum winder to the return pulley at the top of the arm of the crane, it can occur that the spacer elements, no longer in contact with one another, get closer together after undergoing rotations, taking up an anomalous position.

Such an abnormal position prevents the spacers themselves from being arranged in the appropriate configuration, when they are wound in the drum.

Moreover, following the rotations, empty spaces can be created between consecutive spacer elements thus complicating, or even preventing, the recovery operation of the pipes through the return sheave.

It is moreover known, from European patent EP0708270 for there to be a support chain for a pipe, used for guiding the pipe for discharging mud and debris from the hydromill. In the device, described by European patent EP0708270, the spacer elements or guiding elements of the tube, preferably U-shaped, are passed through by two lateral ropes.

In this way the rotation of the guiding elements around the axis of the tube is prevented by the symmetry of the structure, thanks to the presence of the ropes arranged in a specular manner.

In the operative configuration in which the pipe is at the bottom of the excavation, at a great depth, the weight bearing down on the two ropes becomes considerable, in relation to the resistance of the ropes themselves.

Under the action of this weight the ropes undergo stretching such as to create an empty space, or gap, between the return sheave and the last of the elements for guiding the pipe, since the guiding elements, subject to their own weight, stack up on one another, sliding on the ropes, until they occupy the lowest points.

This sliding of the spacer elements is problematic, since it can cause strong vibrations during the recovery of the pipe, and, in some cases, it can cause one or more U-shaped elements, or even the return sheave to break.

Finally, from U.S. Pat. No. 7,845,154, a device is known that is suitable for guiding and supporting the weight of a group of pipes for supplying lines, for example for a hydromill.

Such a device is formed by two branches of chain, connected by transversal bars to the pipes, which are kept at the desired distance by a series of spacer elements, each of which is passed through by at least one pair of ropes.

Usually, in the state of the art existing before this patent, every branch was made up of a single main rope, inserted in the main hole, with a support function.

Said patent attempts to solve the problem of the rotation of the spacer elements when the rope is wound on the drum, or when the branch is suspended vertically along the excavation.

As described in the patent, it is possible, in order to avoid this problem, to insert in every branch a second rope in a suitable hollow housing, so as to avoid the rotation of the elements.

This second rope, due to its function, is always thinner than the main rope since it does not support any suspension or support load.

Said second rope also passes through all the spacer elements comprised in the branch.

In this case a further problem of alignment and spacing of the spacer elements arises, due to the fact that under the great weight of the pipes and of all the hanging parts, the two ropes absorb axial loads in inverse proportion to their rigidity.

The maximum stretching, that the two ropes will undergo, will in any case be associated only to that of the support rope.

In the situation of stretching of the absorption ropes, the second rope, the thinner one, is slow, giving the possibility to the spacer elements of rotating around the hole corresponding to the axis of the support rope.

Moreover, said solution does not solve the aforementioned problem of the stacking downwards of all the spacers present in the branches which go from the winding drum to the upper pulley on the crane arm.

This last patent, moreover, does not solve the problem of the repeated lowering into the excavation, in the case of the progressive stretching of the rope and stacking downwards of the spacer elements, due to their specific weight.

The present invention proposes to solve the aforementioned problems by making a guiding device for supplying pipes for a hydromill in which the spacer elements substantially remain close to one another, when the ropes are stressed more during operation, so as to prevent the formation of empty spaces between them.

Said spacer elements prevent the rotation around themselves, so as to be arranged in a correct predetermined position.

One aspect of the present invention concerns a device for supporting and guiding supplying lines for digging devices with the characteristics of the attached claim 1.

The accessory characteristics are shown in the attached dependent claims.

The characteristics and the advantages of the device for supporting and guiding, according to the present invention, shall become clearer from the following description and from the attached figures which respectively illustrate:

FIGS. 2A, 2B, 2C and 2D show three-dimensional views of spacers, wherein FIG. 2A is a longitudinal section view of the spacer to be inserted in a support branch, FIG. 2B is a plan view from above of the spacer of FIG. 2A, FIG. 2C is a side view of the spacer of FIG. 2A, FIG. 2D illustrates a front view of the spacer according to the present invention, respectively;

FIGS. 3A, 3B, 3C show, in different views, a support branch of the device, respectively: FIG. 3A illustrates a perspective view of a portion of a support branch, FIG. 3B illustrates a side view of two branches one on top of the other on a winder; FIG. 3C illustrates a section view of the branches of FIG. 3B;

FIG. 5A shows a plan view from above of a spacer in a first embodiment with detachable hooks, FIG. 5B illustrates a plan view from above of a spacer in a second embodiment with detachable hooks;

Figure 1:
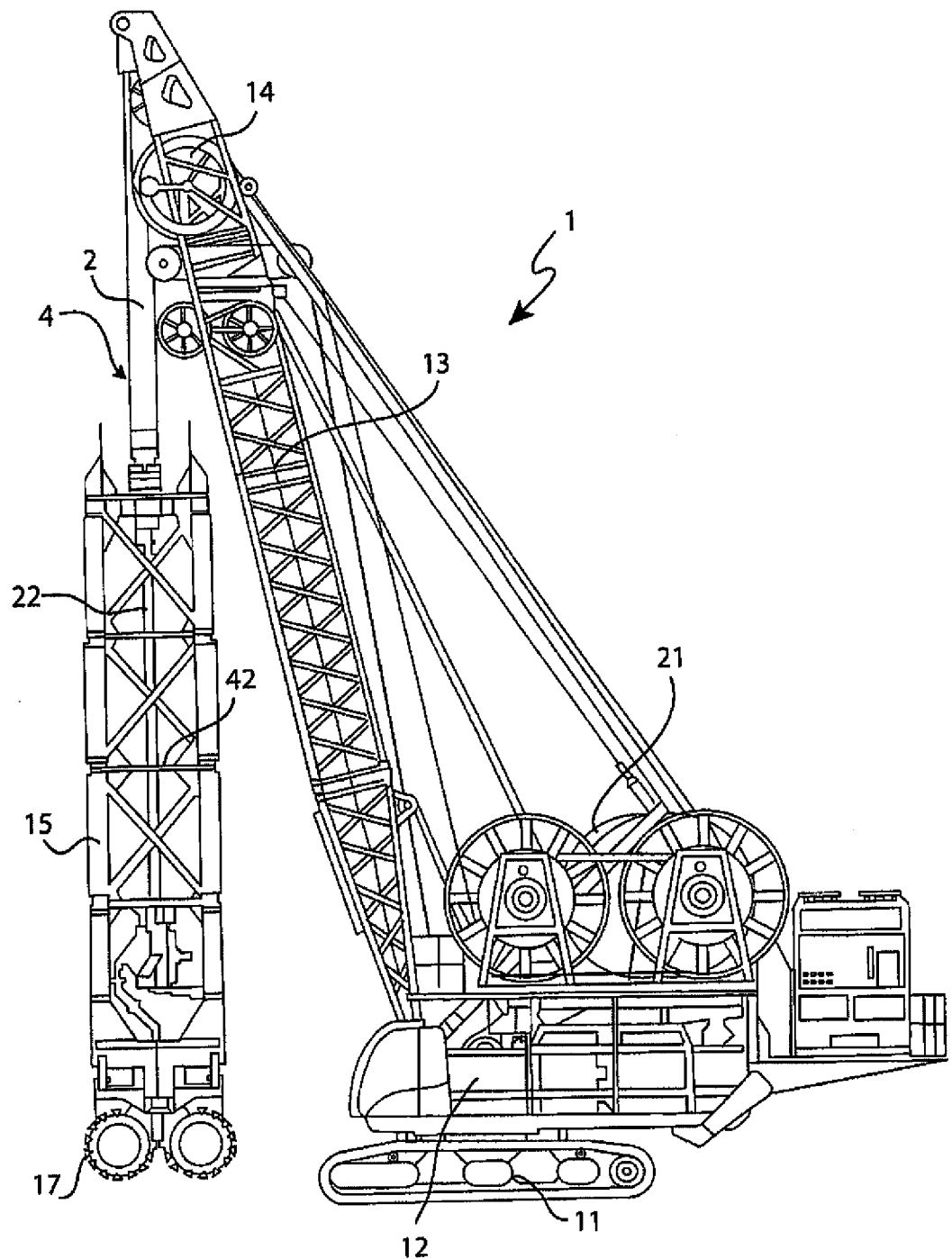
FIG. 1, illustrates an overall view of a drilling machine for diaphragms, with a digging tool equipped with cutting wheels, on which a hydraulic supplying line is installed, comprising the supporting and guiding device, according to the present invention.

With reference to the mentioned figures the device for supporting and guiding supplying lines 2 illustrated is intended to be used in combination with a digging tool 15, for example equipped with cutting wheels 17 arranged below the frame.

Said tool 15 is mounted on a drilling machine 1, preferably for making diaphragms, typically a rope or crane excavator, or a tracked drilling machine with a vertical turret.

Said drilling machine 1 is, preferably, formed by an undercarriage 11 surmounted by a rotating turret 12 and by a lattice boom 13.

Figure 4:
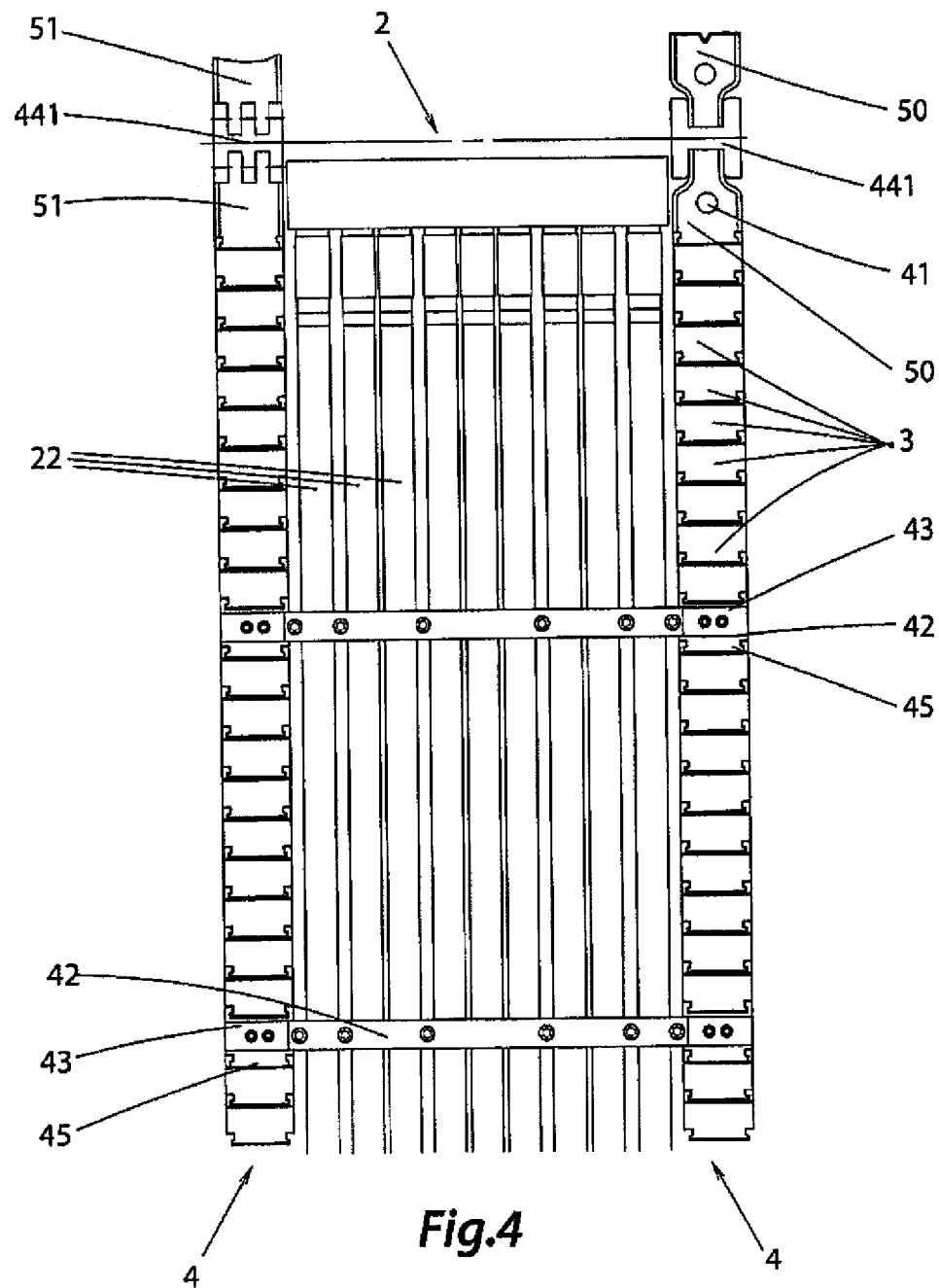
FIG. 4 illustrates an overall front view of the device according to the present invention, comprising two support branches, pipes and crosspieces.

Said device for supplying lines 2 is formed by at least one support branch 4, like for example shown in FIG. 4, formed by a plurality of spacer elements 3, in which a rope or tie-rod 16 is inserted in at least one housing 31 comprised in said spacer 3 and by at least one supplying pipe 22, for such at least one line 2, that is suitable for carrying out both a support function of the weight of the device, according to the present invention, which is downstream of the branch section 4, and the function of keeping the spacers 3 aligned.

Each pair of adjacent spacers (3, 300, 301, 302), comprises retaining means. Such retaining means comprise at least one retaining element or hook 34, associated to a first spacer of said pair of adjacent spacers (3, 300, 301, 302) and at least one slot 35, having a shape substantially matching the shape of said retaining element or hook 34, associated to a second spacer of said pair of adjacent spacers (3, 300, 301, 302).

Said at least one retaining element or hook 34, of each retaining means, during use, engages with said at least one slot 35, allowing a relative axial movement, in the longitudinal direction of the rope 16, of a predetermined amount, such as to prevent said pair of adjacent spacers (3, 300, 301, 302) from moving away from one another, higher than a predetermined value as well.

In the preferred, non limiting, embodiment, each spacer 3, comprises at least one retaining element or hook 34 and at least one slot 35, having a substantially matching shape with the shape of the hook 34.

Preferably, said hook 34 substantially projects along the longitudinal axis of the housings 31, with respect to the box-shaped body of the spacer 3; whereas, said slot 35 is, preferably, formed in the box-shaped body of the spacer 3 as visible in FIGS. 2A, 2B, 2C, 5A, 5B and 6.

As visible in the aforementioned figures, said at least one retaining element or hook 34 and at least one slot 35 are arranged on opposite faces of the same spacer 3.

For the purposes of the present invention, by box-shaped body of the spacer 3 we mean the block, preferably monolithic, of the spacer 3 where at least one housing 31 is located, from which the various components comprised in said spacer 3 itself project. Said at least one hook 34, during use, engages with said slot 35 of at least one adjacent spacer 3.

For the purposes of the present invention by the term slot 35 having a substantially matching shape, we mean a slot 35 having a shape such as to house such hook 34 while leaving a predetermined clearance.

Said at least one hook 34 is essentially formed by at least one elongated part and by at least one mechanical abutment or tooth 341. The elongated parts embrace the adjacent spacer 3', whereas, the mechanical abutment 341 engages in the corresponding slot 35' of the adjacent coupled spacer 3'.

The hooks 34, in this first non-limiting embodiment, are arranged at the sides of the box-shaped body of the spacer 3, keeping the transversal sizes of the spacer 3 substantially unchanged.

A further embodiment, not illustrated, is provided with hooks 34 that lie on an upper and lower plane instead of on the lateral ones. The area used for the tooth 341 will have in this case a transversal development and the slot 35 will thus have a horizontal direction.

Said at least one supplying pipe 22, contains for example hydraulic pipes and/or electrical cables for transmitting signals and/or power.

The supporting and guiding device comprises cross-connection elements or crosspieces 42, that are suitable for supporting the supplying pipes 22, connected to said at least one branch 4.

Said at least one pipe 22, when the lengths are great so as to reach the greatest depths, is divided into elements with a predetermined length, in relation to the length size, with which they are manufactured. The length of each pipe element 22 can be moreover influenced by the modularity, so as to obtain the end lengths as combinations of smaller lengths, by the transportation conditions of the pipes 22, themselves or by the cost-effectiveness of the overall solution.

On average it is possible to obtain, from pipe elements 22 with variable lengths, from 20 m to 60 m, pipes 22 for supplying lines 2 that are suitable for reaching depths from 100 m to 300 m. The electric cable, placed inside the tube 22, can be made as a single piece, or be divided into the single sections equal to the number of pipe elements 22.

Said crosspieces 42, comprised in the supporting and guiding device, are suitably separated by a plurality of spacers 3.

Said crosspieces 42 comprise at least one seat, preferably having a cylindrical shape, suitable for holding the pipes 22. Said seats, in one non-limiting embodiment, are preferably spaced at equal distances from one another, in a way such as to create a tidy array of pipes 22 also substantially equally spaced apart. Said crosspieces 42 are advantageously made like a clamp, or pincer that can be opened and can be mounted on the rope 16 even when this has already passed in all the spacers 3.

In the embodiment of each branch 4, at every spacer 3 the rope 16 is inserted through the suitable housings 31.

In the detail illustrated in FIGS. 3A, 3B, 3C and 6, each hook 34 of a spacer 3 is positioned inside the slot 35' of the following spacer 3', and in turn the hooks 34" of the previous spacer 3" are housed in its own slots 35.

In one non limiting embodiment of the present invention, the drilling machine 1, illustrated in FIG. 1, a sheave 14 is preferably mounted on the lattice boom 13, which returns one or more pipes 22, for the supplying lines 2, in which hydraulic pipelines and/or at least one electrical wire run.

The device for supporting and guiding supplying lines 2, is suitable for connecting said drilling machine 1 to the digging tool 15, which is moved by a winder 21, preferably motorized, which is installed on board of the rotating turret 12.

As an alternative to the machine illustrated in FIG. 1 it is possible to use a classic drilling machine with a vertical turret, as a replacement of the lattice boom 13. Moreover, the winder 21 could, in an alternative embodiment, be fixed to a suitable fixed or mobile means which is placed in a predetermined configuration with respect to the machine, so that the supplying lines 2 can move and wind regularly.

Figure 3A:
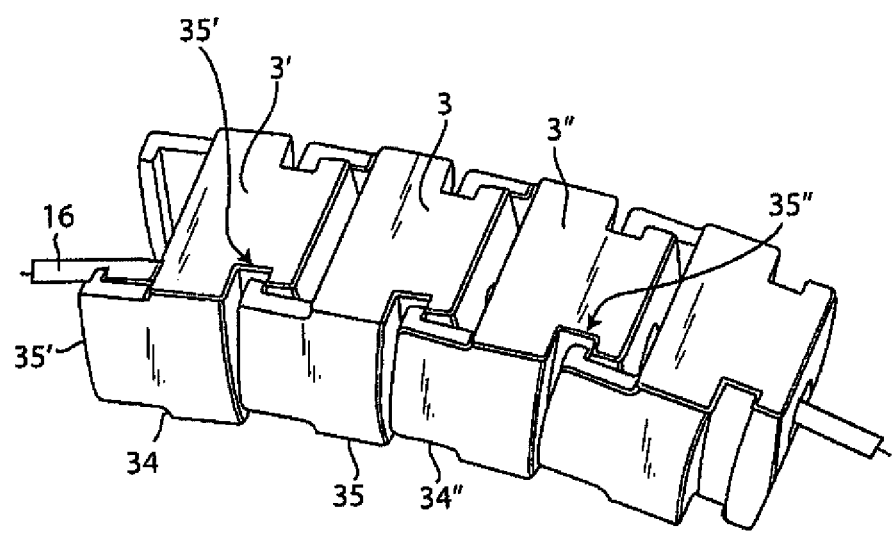

As illustrated in FIG. 3A, for each spacer 3, the dimension of each slot 35 is such as to allow the previous spacer 3" to move away from the spacer 3 in the longitudinal direction of the rope 16, within predetermined values. When such a predetermined value has been reached, the hook 34" abuts against an inner face of said slot 35, thus preventing further movement of the two spacers away from one another.

Each spacer 3 of said branch 4, in a first non-limiting embodiment, comprises at least one projection 32 and at least one recess 33, having matching shapes with one another.

Said projection 32 and said recess 33, arranged on faces that are opposite one another, preferably on the upper and lower faces, are suitable for collaborating to keep the spacers 3 fixedly attached when the branch 4 is wound on the drum 21 of the winder.

In the embodiment illustrated in FIGS. 2A, 2B, 2C and 2D, each spacer 3 comprises two protuberances 32, having a triangular vertical section, arranged at the ends of a face of the spacer 3 and just as many matching recesses 33. The two projections 32 and the two recesses 33 are arranged symmetrically with respect to the middle plane, as visible in FIG. 2B, contributing to keeping the size of the spacer 3 as small as possible. Differently from the conventional solutions with a single tooth and single groove arranged on the plane of symmetry, this solution with two protuberances and two recesses prevents weakening the spacer 3 around the through housing 31.

When the branch 4 is wound on the drum winder 21, the projections 32 of the spacers 3 present on a given layer, engage with the grooves of the spacers on the following layer. In such a way, the winding of the supporting and guiding device occurs in a tidy manner, thus preventing, for example, the central section of the branch 4 between the two crosspieces 42, from resting on the pipes 22, causing the crushing or the wrong positioning of the parts being wound.

In one embodiment that has not been illustrated, the spacer 3 comprises many teeth 32 and many recesses 33 arranged on the suitable faces, in a way such as to increase the properties of supporting and guiding of the device, according to the present invention during the winding.

One variant of the spacer 3 that has not been illustrated comprises the projections 32 and the recesses 33 on the lateral arched faces, laterally with respect to the through housing 31.

Figure 3B:
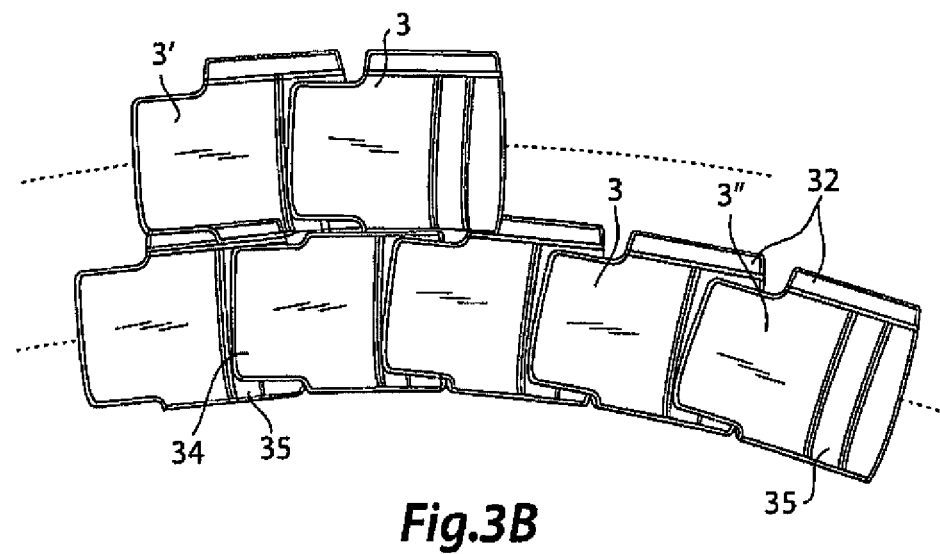

In general, the shapes of said at least one slot 35 and of said at least one hook 34 of each single spacer 3, are such that the clearance existing between every hook 34 and the respective slot 35 allows the branch 4 to bend, taking up a predetermined minimum radius of curvature, as illustrated in FIGS. 3B and 3C.

The coupling of such a slot 35 and hook 34 allows the branch 4 to be able to bend in a preferential plane that is perpendicular to the rotation axis of the drum winder 21. As visible in FIG. 3A, the hooks 34 embrace the adjacent spacer 3 and engage in the respective slots 35.

This indeed allows the guiding and supporting device according to the present invention, to be wound on said drum 21 with a circular section.

Figure 2A:
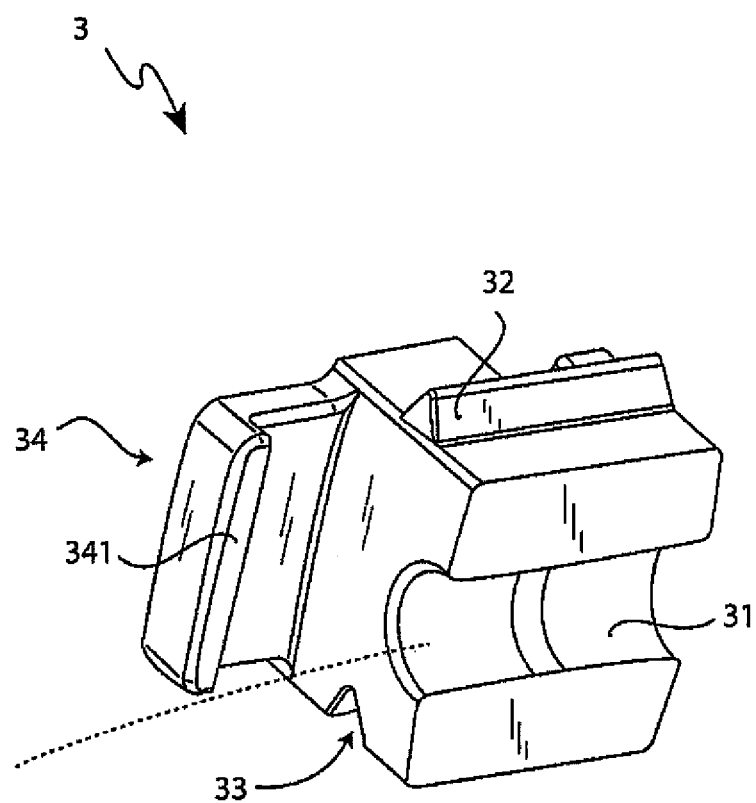
Figure 2B:
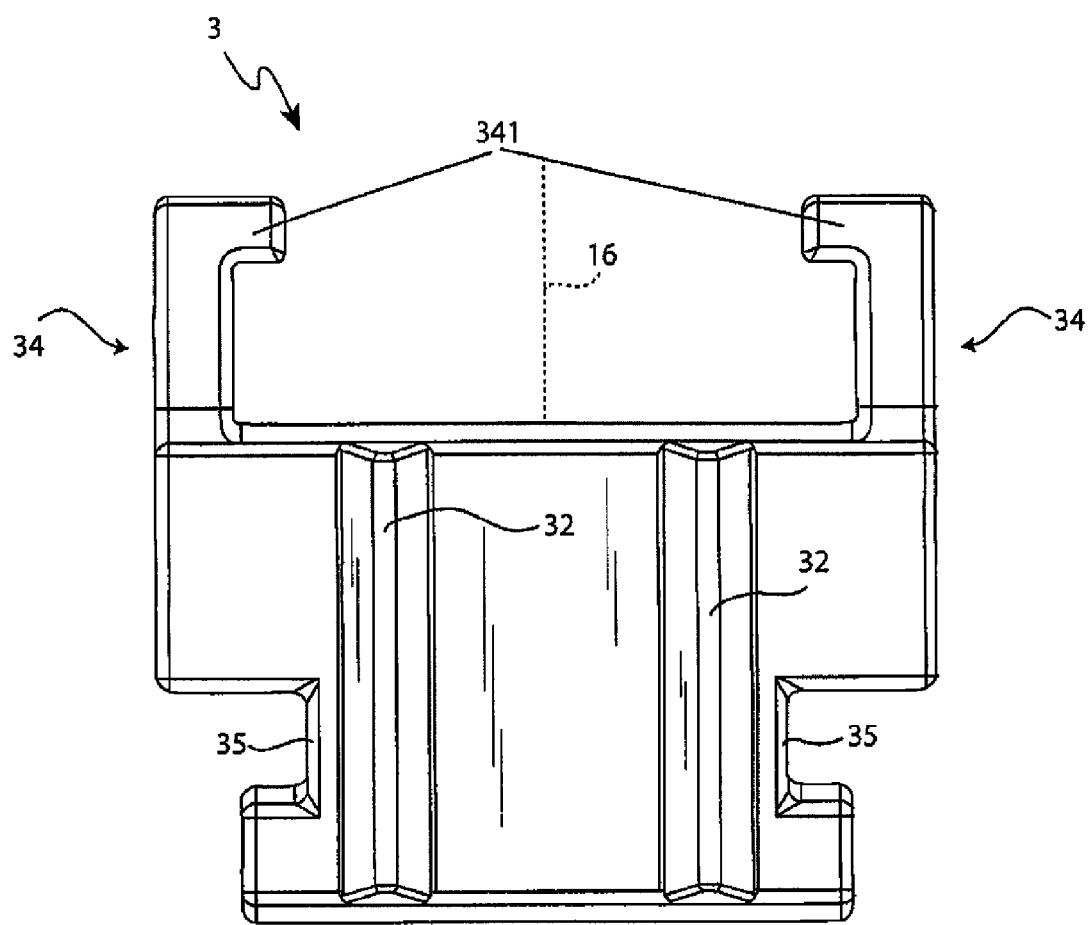
Figure 2C:
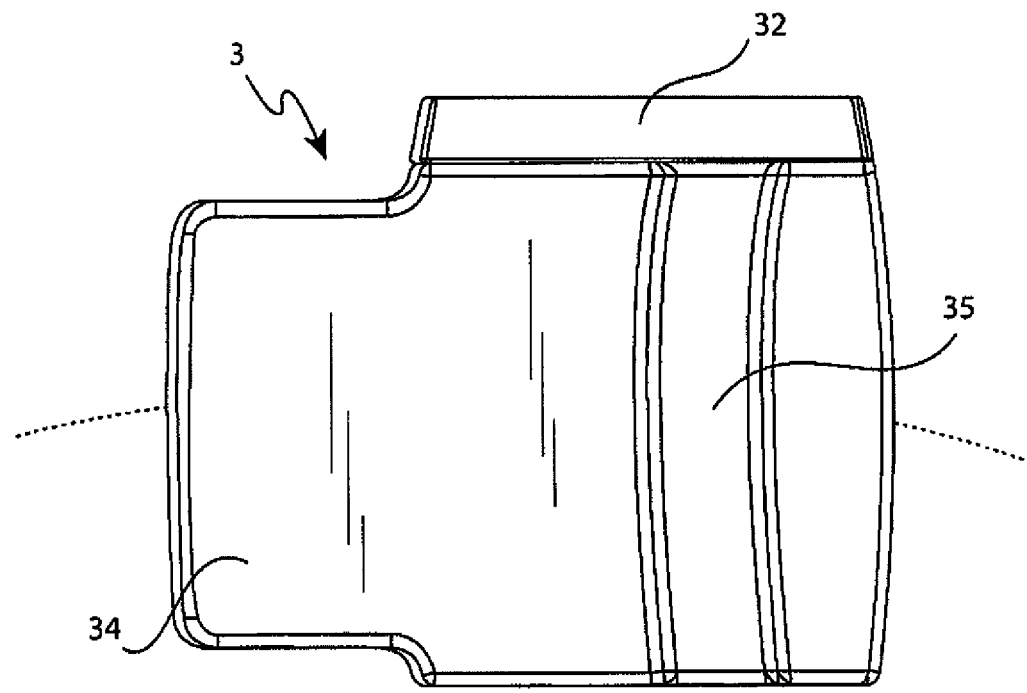
Figure 2D:
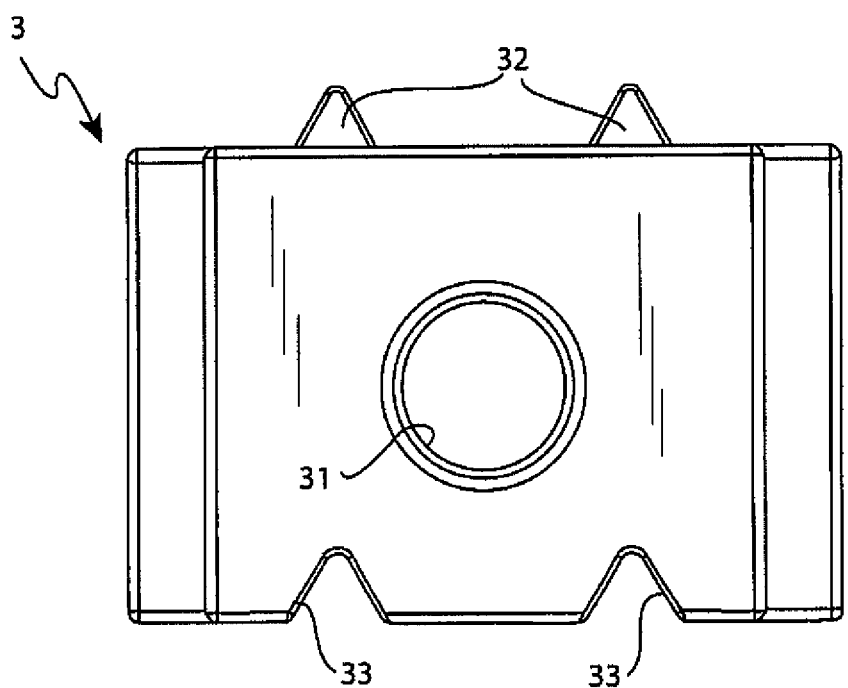

As illustrated for example in FIG. 2C, said slot 35 takes up two inclined profiles in a specular manner with respect to the longitudinal axis of the through housing 31, so as to allow a bending of the branch 4. In particular, said slot 35 is a groove that is open on both sides facilitating the mounting of the coupled retaining element or hook 34", allowing the correct relative mobility between two adjacent spacers when the branch 4 is inflected.

The transversal height size of the hook 34, are smaller than the transversal height size of the box-shaped body of the spacer. In such a way, when the spacer 3 takes up a rotated configuration due to the winding on the drum 21, the bulk of the hook 34 remains inside the contour of the upper curved surface lying on the upper planes of the spacer elements 3 of a winding. Or rather, since the hook 34 is proportionally lower with respect to the overall height of the spacer 3, in relation to the minimum radius of curvature on the winder, and consequently with respect to the rotation angle induced on the element, it is obtained that in every wound configuration, said hook 34 does not project beyond the upper plane of the elements belonging to a winding layer. The shape of the hook 34 makes it possible to avoid jamming, interferences, wearing or concentrated points of stress when the following layer is wound on them.

As visible in FIG. 3B, in the winding on the drum 21, every hook 34 is positioned at the box-shaped bodies of the spacer 3 arranged in the previous and following loop. Moreover, in such an embodiment, the compression forces, caused by the layers of the supporting device subsequently wound on the drum 21, bear down on strong areas of the spacer 3, like for example the box-shaped body of the spacer 3 itself, preventing said forces from acting on the teeth 34 of the spacers 3.

Normally, during use, when the loads are small, two adjacent spacers 3 are in contact. The contact between the spacers occurs on the inner faces on which said at least one through housing 31 lies, suitable for the passing of the support rope 16, more clearly visible in the section of FIG. 3C. These contact faces are, preferably, rounded so as to allow the bending of the branch 4 and its winding around the drum 21 of the winder.

FIG. 2C illustrates the spacer 3 in a side view, which clearly shows the curved lateral surface, near the slot 35 of the spacer element 3. Since the branch 4 must pass from the rectilinear configuration to the curved configuration when wound on the winder 21, it therefore comprises spacers 3 having a surface like that represented, so as to generate a free rotation around an axis that is perpendicular to the axis of the rope 16, between the contiguous elements and a correct coupling between the various spacers 3.

Said faces of the spacers 3 have shapes such as to ensure a coupling, for example they can both be convex, or matching: one convex and the adjacent one concave, or again one convex and the adjacent one flat for example, the lateral faces of the spacer 3 passed through by the housings 31, are arched so as to ensure the possibility of rotating around the middle plane of the spacer 3 itself.

When on the other hand the branch 4, during use, undergoes a heavy load such that the spacers tend to move away from one another, the hook 34 and the slot 35 come into contact in such a way that two adjacent spacers 3 do not move away from each other excessively.

Indeed, during operation the loads applied to the branch 4 ensure that the supporting rope 16 stretches out and that the spacers 3 tend to move away from one another. In this device, the hooks 34 and the respective slots 35 of two adjacent spacers come into abutment with one another and prevent both an excessive movement away and a relative rotation, even of a few degrees, differently from what happens in conventional devices previously described.

The bending of the branch 4 in the other two directions can be completely prevented, or be very 15 limited. Indeed, there can be small clearances in the coupling between the slots 35 and the hooks 34 of a spacer 3 and of those that come before/after it (3', 3") such as to allow the branch 4 to have small deviations in its path from the drum winder 21 to the digging tool 15.

In particular, the shape of the slots 35 and of the hooks 34 comprised in the spacers 3 are designed so as to avoid an even partial relative rotation, between two adjacent spacers 3 around the axis of the rope 16, even when this rope 16 is stressed during the operative steps of the operating machine 1, for example due to the involved loads.

The shape of said at least one hook 34 partly winds at least one side of at least one adjacent spacer 3, in order to abut against said slot 35, thus preventing pivoting around the axis of the rope 16 of the spacers 3. As visible in FIG. 3A, the hooks 34 embrace the adjacent spacer 3 and engage in the respective slots 35.

In such a way, the two adjacent spacers 3 are prevented from taking up an abnormal position, warding off possible breaking and jamming during the of the digging tool 15.

In the preferred embodiment, said at least one retaining element or hook 34 is made at the same time as the spacer, obtaining a monolithic block.

Such a monolithic spacer 3 is made for example, through a mould, or through fusion, or, alternatively, it is made through mechanical machining.

In the embodiment of FIGS. 2A, 2B, 2C and 2D the spacer 3 is equipped with two hooks 34 and with two slots 35.

In FIG. 2B it is visible how the hooks 34 and the slots 35, made to be suitably coupled are specular with respect to the plane of symmetry of the spacer 3.

In the embodiments illustrated in FIGS. 5A and 5B, said at least one retaining element or hook 34 and said slot 35 are removable or dismountable, in a rigid manner, being able to be installed subsequently to the making of the box-shaped body of the spacer 3.

Said hook 34 is fixed with a forced rigid mechanical connection like for example coupling with pressure, grooves, gluing, or with removable mechanical connections such as screws, pins, etc.

Figure 5A:
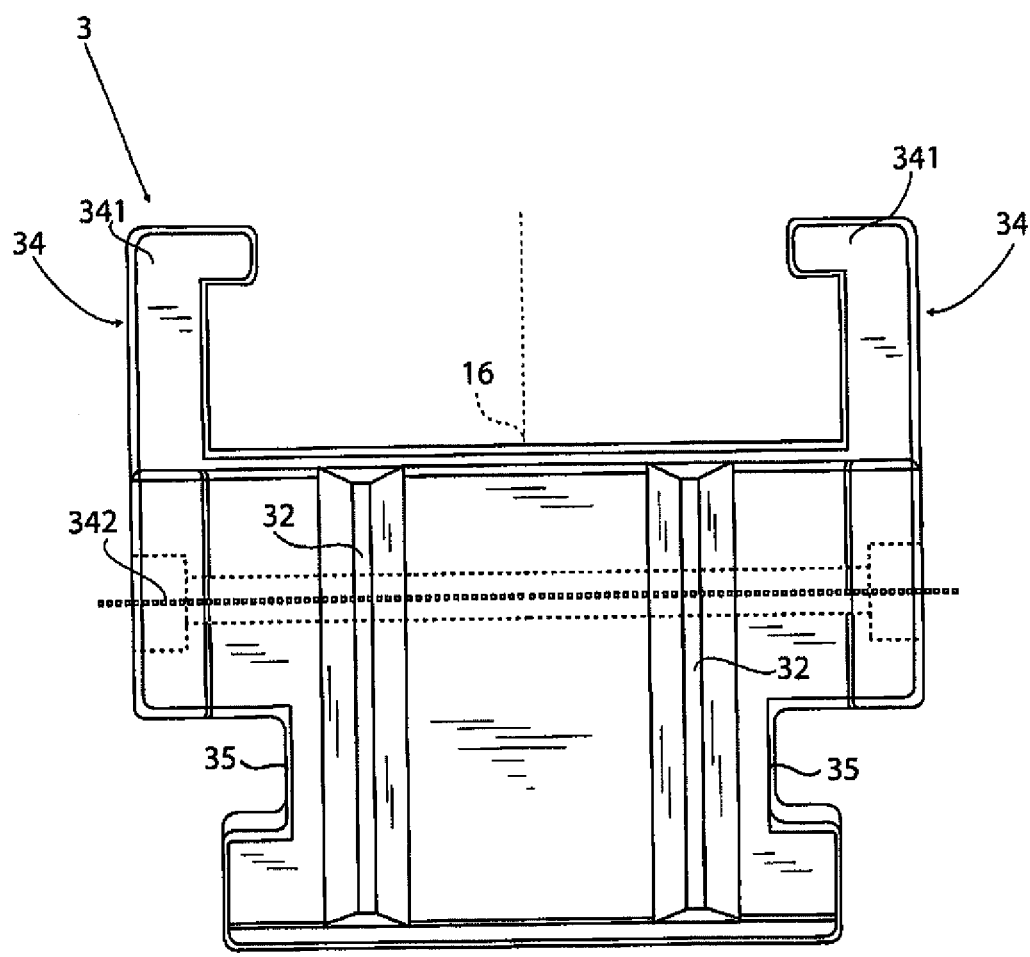
FIGS. 5A, 5B show different views of the spacers, respectively.

In the embodiment illustrated in FIG. 5A said hooks 34 are fixed to the box-shaped body of the spacer positioned through screws 342, which are positioned perpendicular to the axis of the housing 31.

Figure 5B:
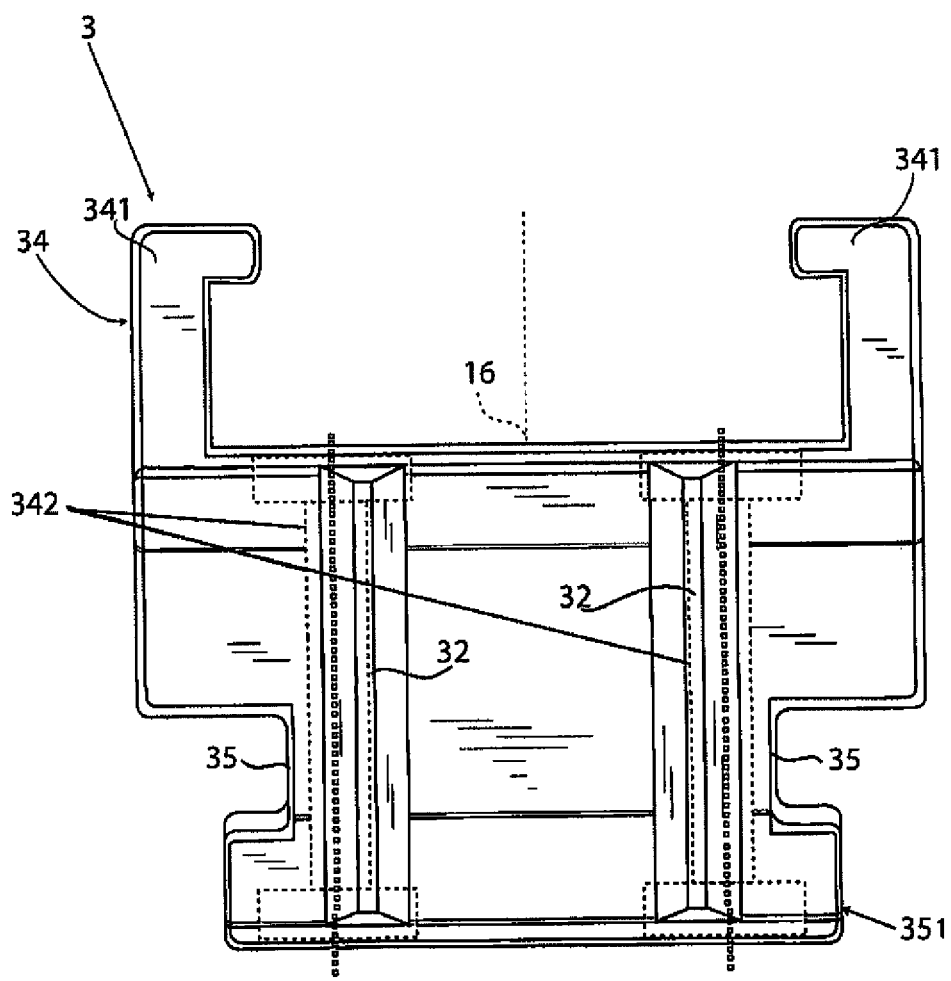

FIG. 5B, illustrates an embodiment in which the slot 35 is made by fixing a plate 351 to the substantially "C"-shaped box-shaped body of the spacer 3 through said screws 342, arranged parallel with respect to the axis of the housing 31.

Such an embodiment makes it possible to obtain the hooks 34 and the slots 35 with a different material with respect to that of the box-shaped body of the spacer 3, for example a more resistant material, without increasing the overall weight of the spacer itself. In such a way the branch 4 can advantageously support a greater load.

The number of spacers 3, comprised in the supporting and guiding device, therefore, depends on the depth of the excavation which is to be carried out, on the number of crosspieces 42 installed and on the mounting pitch of the latter.

Preferably, the device, according to the present invention, comprises two support branches 4 that are kept equally spaced by a plurality of crosspieces 42, connected to them.

In the preferred embodiment, the spacers 3 of each branch 4 are provided with a through housing 31 for the rope 16 to pass through, for example a hole.

Advantageously, the through housing 31, where the rope 16 is inserted, has a tapered shape with maximum opening towards the outside, in a way such as to prevent the rope 16 from coming into contact with the outermost corner of the housing 31, once the branch 4 is wound on the winder 21, rotating with respect to the previous configuration. In detail, the optimal angle of aperture of the housings 31 is, for example, of between 4° and 15°, where 5° is the preferred value.

In the preferred embodiment, said through housing 31 is arranged at the centre of the spacer 3 itself, at an axis of symmetry of the spacer 3. FIG. 2A illustrates one of the spacers 3 on the lateral faces of which there is a through housing 31, advantageously made with a diameter that is slightly greater than the diameter of the rope 16, conically flared towards the end edges. The spacer 3, in this preferred embodiment, is equipped with a plane of symmetry and the axis of the through housing 31 is contained in said plane.

Figure 6:
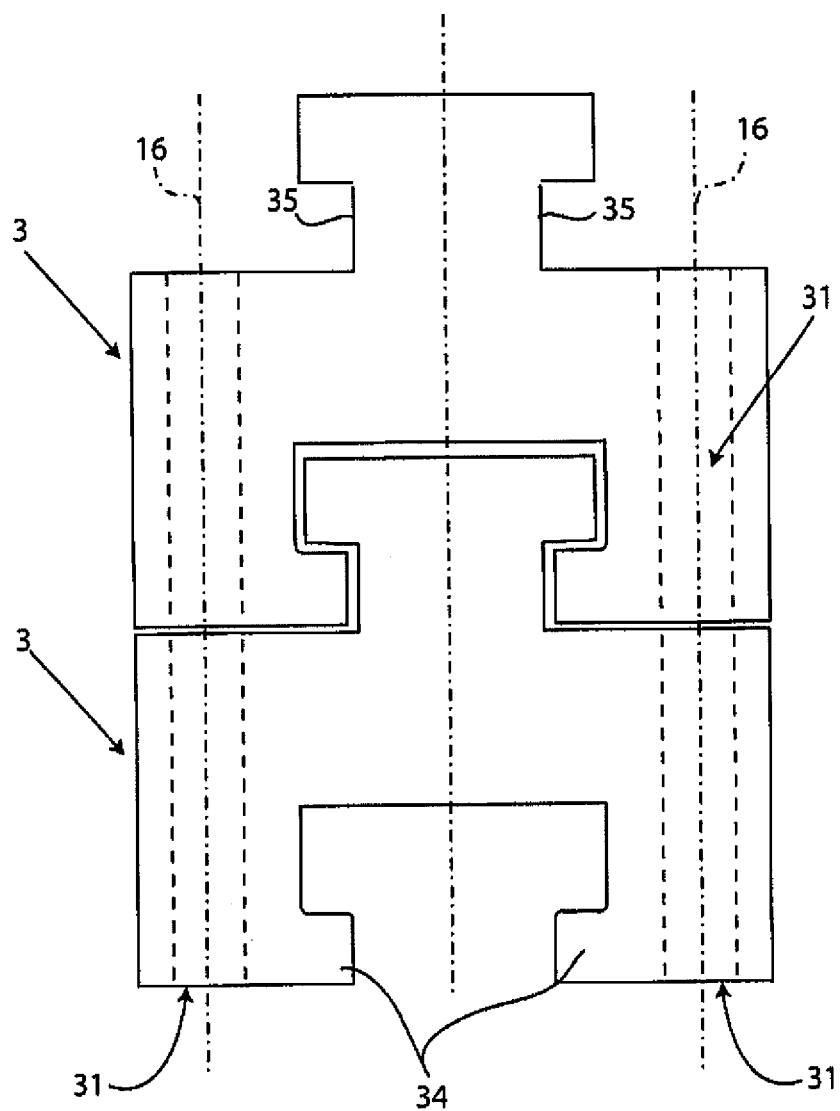
FIG. 6, illustrates a plan view from above of two spacer elements that can be coupled in a further alternative embodiment.

In an alternative embodiment of the spacers 3, illustrated in FIG. 6 these comprise, on the lateral faces, at least two through housings 31, for example holes or slots, which are used for passing through the rope or tie-rod 16. Such a spacer 3 is equipped with at least one plane of symmetry, in which said two through housings 31, are arranged parallel and in a symmetrical manner with respect to the structure of the spacer 3 itself. Said housings 31 are advantageously made with the same diameter. In this case, the hook 34 and the slot 35 are internal with respect to the housings 31 on which the ropes 16 pass.

In such an embodiment, one branch 4 of the rope or tie-rod 16 enters from below, passes through all the spacers 3 of the considered portion, passing inside the housings 31 which are on one side of the middle plane, for example the right side, to then turn around a return pulley 41 and pass back through the spacers 3 again in reverse order, passing in the housings 31 on the other side with respect to said plane.

The rope 16, therefore, creates a sort of closed ring, passing at least two times each single spacer 3.

Moreover, the rope 16, passing through the spacers 3 for at least two times, prevents the spacers from rotating with respect to the predetermined position.

The load is distributed on the two sections of rope 16, allowing a rope 16 with a smaller diameter with respect to the solution with a single rope to be used.

The device, according to the present invention, makes it possible to discharge the stress applied on the supply lines 2 on both the sections of rope 16 forming the closed ring.

Advantageously, the rope 16 is of the non-rotating type, so as to prevent it during the stretching, in operation, from rotating on itself. Moreover, said rope is advantageously pre-stretched so that the plastic yielding is already present at the moment of first assembly.

One first variant of the spacer 3, not illustrated, is provided with through housings 31 made like semi-open lateral notches. In such an embodiment it is 25 possible to mount the ropes 16 with a lateral inlet, in a facilitated manner.

The support rope 16 can undergo a preload, for example generated by the insertion of at least one tensioning element, preferably axial spacer tensioners 43, 45, or additional crosspieces 42 or additional spacer elements 3.

The preloaded rope, advantageously, helps to reduce the cases in which the spacer elements 3 can move away from one another. This indeed occurs only when the overall applied load on the rope 16 is greater than the preload value.

The preload value, applied on the rope 16, is a function of the weight that each branch 4, or portion thereof, must support, and in particular, of the weight that each portion, of which every branch 4 is constituted, must support.

Preferably, the first section of support branch 4, closest to the winder 21, is preloaded with a very high preload value and greater with respect to the other portions of branch 4 near to the digging tool 15; indeed, such a value decreases when moving towards the digging tool 15.

Both in the case of a preloaded rope 16 and in the case in which the rope 16 is not preloaded, the spacers 3 are almost in direct contact with one another, or at least they have a minimum clearance equal to the predetermined one. The rope 16 used in the device, according to the present invention, is preferably a rope or tie-rod that is in an already pre-stretched state, in which the proportional stretching of a certain axial load is much lower and easier to control. In one variant the ropes 16 passing through the spacer elements represented in FIG. 6 can be two. The spacer elements 3 themselves can be equipped with teeth 32 and slots 33, as already indicated in the preferred 30 embodiment.

The digging tool 15 is for example a hydromill that can be used for making diaphragms rectangular/parallelogram section, or a tool equally shaped, for example for the mechanical mixing, used in the consolidation methods through the injection of cementing material. One variant of the tools equipped with cutting and mixing wheels, previously described, is provided with excavation of piling screens, made with tools with a vertical rotation axis, with excavation methods with a single or guided hole.

Each branch 4 comprises, moreover, end elements (50, 51), that are arranged at the ends of each element or portion of branch 4.

Two contiguous elements, constituting a support branch 4, are fixed to their contiguous ends, through the end elements 50 or 51.

The connection of the elements constituting a support branch 4 occurs through a jointed element 441 that joins the end elements 50 or 51.

Said jointed element 441 comprises, for example, hinges which allow a relative rotation thereof, which is necessary when the supporting and guiding device is wound in the winder 21.

A second alternative embodiment of the interconnection between the portions constituting a support branch 4 is illustrated in the right branch of FIG. 4, where the connection between contiguous elements is formed through the end elements 51 and the jointed element 441, also connected through pins forming a hinge.

Said axial tensioning spacers 45 are especially made with a thickness that is modified with respect to the spacers 3.

These axial tensioning spacers 45 are necessarily open on one side so as to be suitably inserted and embrace the two portions of rope 16.

One method for pre-loading the rope 16 comprises fixing at least one end element 50, 51 or at least one cable press 44 of the rope or tie-rod 16, once the rope 16 itself has been suitably preloaded, by pulling one of the two ends.

Preferably, said end elements 50, 51 have an equivalent diameter that is greater with respect to the diameter of the rope 16 and of the housings 31 of the spacer 3.

In the end elements 50 or 51, there is the return pulley 41 that is suitable for allowing the rope 16 to create a closed loop.

FIG. 4 shows an overall group of a section of the device according to the present invention, in which there are two support branches 4, arranged laterally and connected by a plurality of crosspieces 42. Said crosspieces act as retaining clamps of the pipes 22, where the hydraulic pipes run and sometimes at least one electrical cable.

A plurality of axial tensioning spacers 45 are installed against the crosspieces 42, so as to create a continuity between the spacers 3 and the crosspieces 42.

One alternative embodiment of the supporting and guiding devices, suitable for low depth excavations, comprises a single support branch 4, preferably mounted at the centre of the supplying line 2; whereas, in the case of greater excavation depths, it is preferable to use at least two branches 4.

Figure 7A:
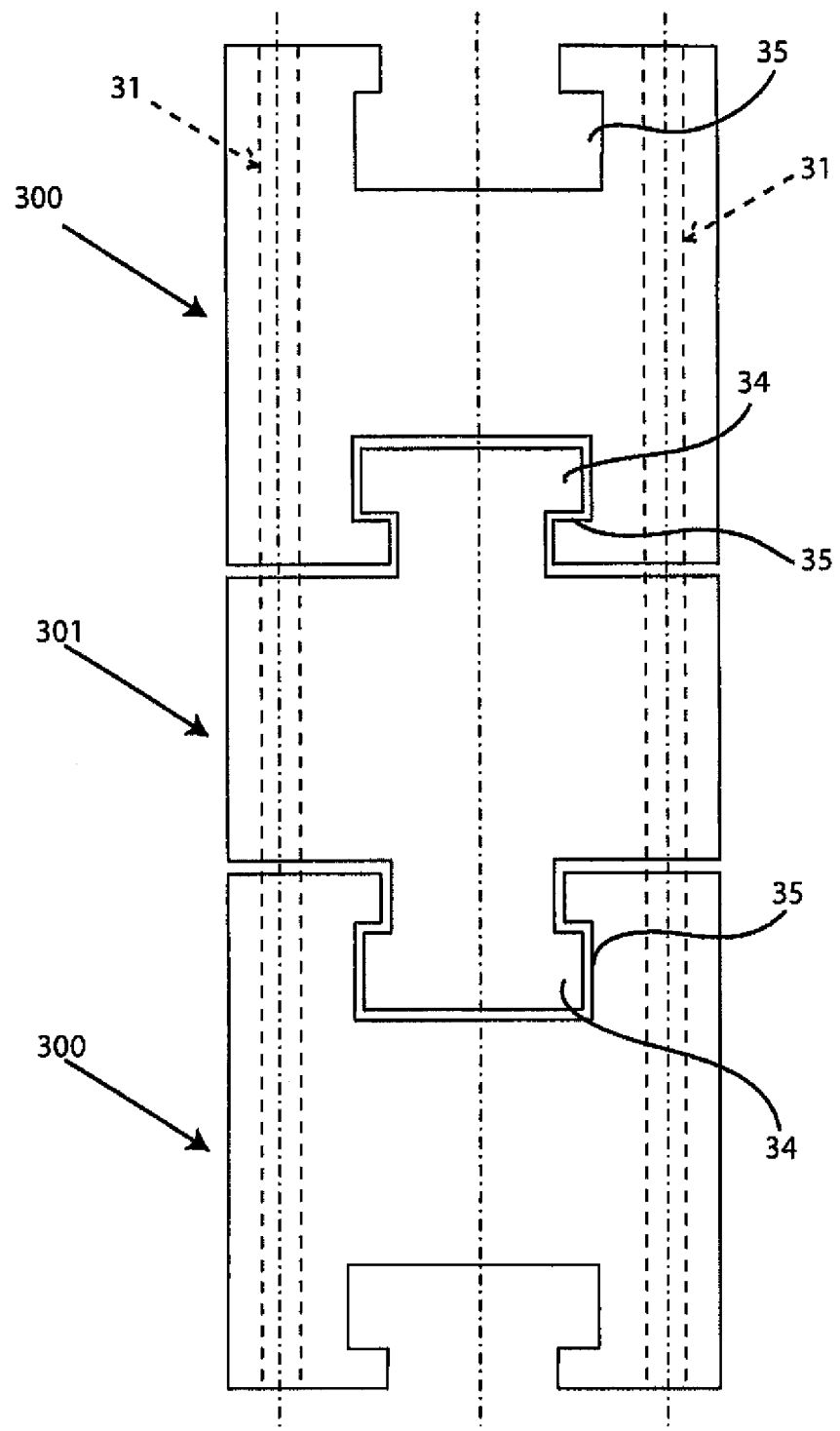
FIGS. 7A, 7B show a plan view from above of three coupled elements in a further embodiment different to those shown in FIG. 6.

FIG. 7A shows a variant embodiment of the spacers 3 previously described.

In the detail there is a first spacer element 301 shaped with at least two retaining elements or hooks 34, preferably arranged on two opposite faces of said first spacer element 301. Such a first spacer element 301 is mounted along the support branch 4, alternately to a second spacer element 300 made up of at least two slots 35, preferably arranged on two opposite faces of said second spacer element 300.

In such a way said first element 301, couples with said element 300, ensuring that its retaining element or hook 34 is inserted, during use in abutment in the slot 35 of the second element 300 that precedes it. Vice versa the first element 301, couples with the following second element 300, ensuring that the other retaining element or hook 34 is inserted during use in abutment in the slot 35 of the second element 300 that follows it.

The support branch 4 is thus made up of an alternated sequence of first elements 301 and second elements 300 that are equipped with couplings in abutment that are suitable for allowing a relative axial movement, in the longitudinal direction of the rope (16), of a predetermined amount, such as to prevent the two spacers themselves from moving away from one another, higher than a predetermined value as well.

Figure 7B:
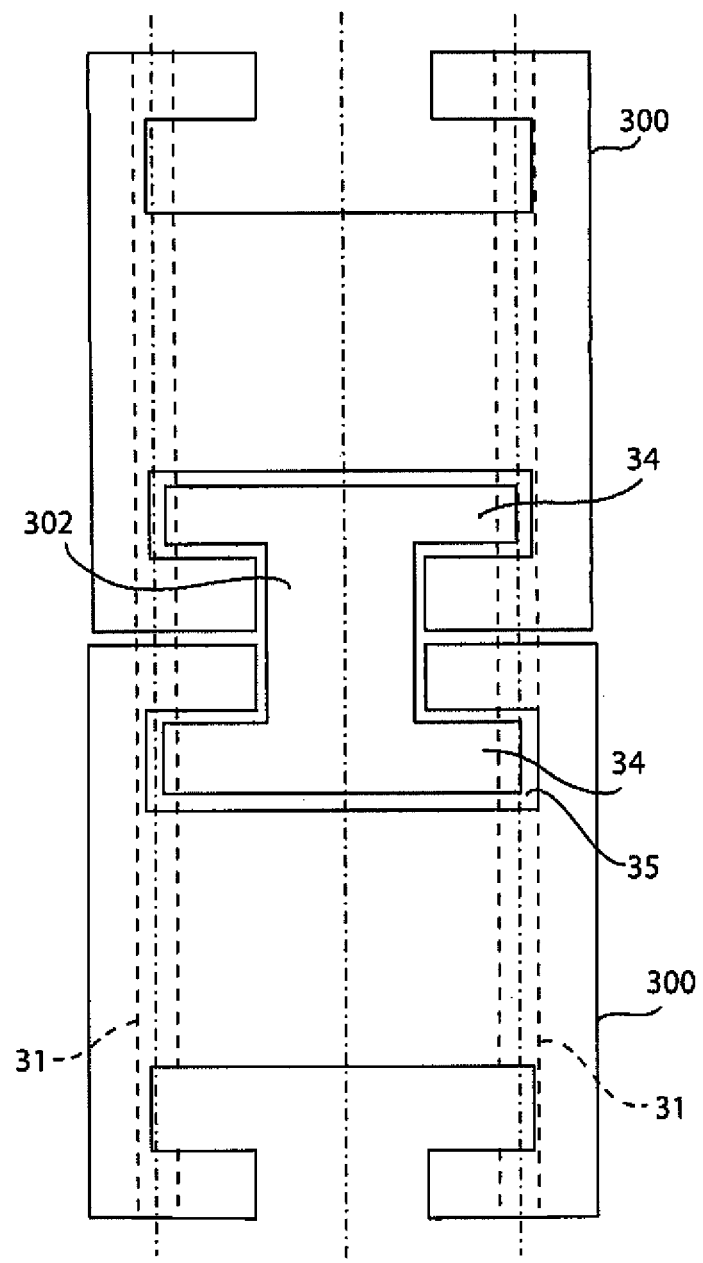

In the variant represented in FIGS. 7A, 7B the housings 31 for the ropes 16 are at least two and are positioned at the ends. It should be understood that such a solution can be made like spacers 3 represented in FIG. 2A-2D, 3A-3C or 5A-5B.

FIG. 7B shows a further variant embodiment of the spacers 300 and 301 of FIG. 7A. The second spacer elements 300 are made up of at least two slots 35 and are mounted along the support branch 4, alternated to the first spacer elements 302 shaped with at least two retaining elements or hooks 34, but having longitudinal dimensions that are very compact.

This variant make is possible to obtain the spacer elements 302 with highly resistant materials, like for example steel, alloy, or in any case with materials having low specific weight but that are generally more costly, such as aluminum, titanium, carbon fibre, concentrating the maximum stress on this component of the chain and allowing the second elements 300 to be less stressed and geometrically stronger, so as to make them with low-cost materials, like for example steel, cast iron, or lighter ones, like plastic materials. Indeed the lightness is a parameter that determines the size of ropes and consequently all the elements that fit together, and therefore being able to reduce the weight, makes it possible to structurally simplify the retaining elements.

An application variant is therefore that through which the spacer elements 3, 300, 301 are made with floating materials, or box-shaped materials that are empty inside, so as to allow an overall lightening of the supplying line 2 when it is inserted in the hole that is generally filled with liquid, like for example water or thixotropic mixtures.

In the variant shown in FIG. 7B, the compression contact between the spacer elements advantageously occurs between the transversal surfaces of the elements 300 mounted alternately. In the case in which, on the other hand, the contact occurs at the centre, between the abutment element 34 and the internal face of the element 300, such a central part of the spacer element 300, could be made with the insertion of hard material so as to ensure a suitable resistance to loads and prevent wearing.

Figure 8A:
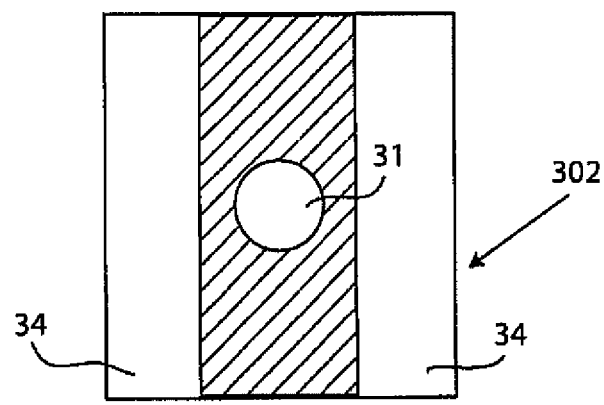
FIGS. 8A, 8B show a cross-section view of a variant of the spacer element of FIG. 7B.
Figure 8B:
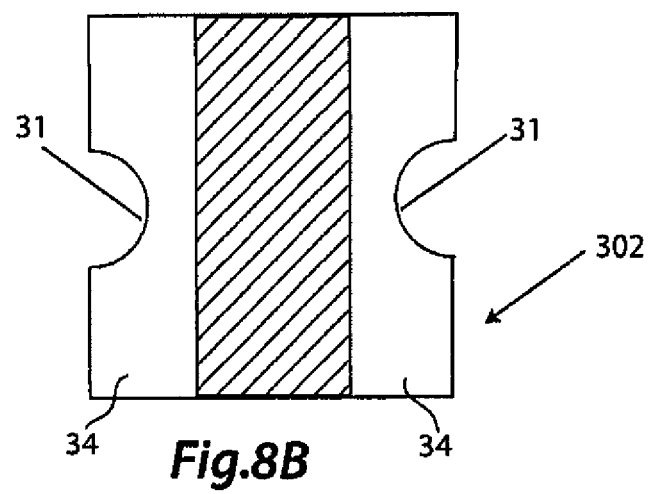

In order to prevent the spacer element 302 from also being fixed in a direction perpendicular with respect to the axis of the rope 16 (i.e. in the insertion direction of the couplings during assembly), the abutment elements 341 have at least half-slots open at the edges, as represented in FIG. 8B, with the function of partially housing the rope 31, near to the middle plane, so that the rope 16 inserted in the housings 31, prevents the aforementioned movements.

In the variant with a central rope, FIG. 8A, the spacer element 302 is passed centrally from one housing 31, in the considered case a hole, so that the rope 16 inserted in it, supports the spacer, allowing it to keep the reciprocal transversal position, with respect to the adjacent elements 300.

The invention proposed makes it possible to solve the main problems that affect the solutions known to this day in the field. In particular, the spacers 3 can never separate from one another since every spacer 3 comprises a retaining element or hook 34 which during use engages with said at least one slot 35 of the adjacent spacer 3.

The spacers 3 and the crosspieces 42, which are passed through by the rope 16, have a thickness which is slightly greater than that of the pipes 22, making it possible to install a winder 21 on board of the machine with smaller dimensions and lower weight, with respect to known solutions. This is possible since the supporting and guiding device, comprising the supply lines 2, has a minimum thickness, taking up less space when it is wound on the drum of the winder 21.

The invention claimed is:

1. Device for supporting and guiding supplying lines intended to be used in combination with a digging tool mounted on a drilling machine; said device comprising:
   at least one support branch, formed by a plurality of spacers adjacent to one another, wherein a rope or tie-rod is inserted through a housing of each spacer of the plurality of spacers;
   wherein a pair of adjacent spacers in the plurality of spacers comprises retaining means, the retaining means comprising:
      a pair of retaining elements or hooks associated to a first spacer of said pair of adjacent spacers; and
      a pair of slots, having a shape substantially matching the shape of said pair of retaining elements or hooks, associated to a second spacer of said pair of adjacent spacers,
   wherein said pair of retaining elements or hooks during use engages with said pair of slots, allowing a relative axial movement in the longitudinal direction of the rope or tie rod of a predetermined amount.

2. Device according to claim 1 wherein each spacer of the plurality of spacers comprises a pair of slots and a pair of retaining elements or hooks, arranged on opposite faces, to engage adjacent spacers.

3. Device according to claim 1 wherein said second spacer of said pair of adjacent spacers has two pairs of slots arranged on opposite faces of the second spacer, each pair of slots of the two pairs of slots adapted to engage with a pair of retaining elements or hooks of adjacent spacers, each of said adjacent spacers comprising two pairs of retaining elements or hooks, arranged on opposite faces of the each of said adjacent spacers.

4. Device according to claim 3, wherein said second spacer is made of a first highly resistant material, and the adjacent spacers are made of a second low-cost material.

5. Device according to claim 1, wherein the shape of said pair of retaining elements or hooks partly winds two sides of at least one adjacent spacer, in order to abut against said pair of slots, thus preventing the spacers themselves to pivot around the axis of the rope.

6. Device according to claim 1, wherein the spacers comprise at least a projection and at least a recess having a matching shape, arranged on faces opposite to one another of each spacer of said support branch.

7. Device according to claim 1, wherein said spacers comprise a housing through the centre of the spacers.

8. Device according to claim 1, wherein each spacer in the plurality of spacers comprises two housings arranged through side ends of the each spacer.

9. Device according to claim 8, wherein said housings are semi-open lateral notches in the each spacer to allow the rope to be inserted.

10. Device according to claim 1, wherein the rope passing through said housing is preloaded.

11. Device according to claim 1, wherein a height transversal size of the at least one hook is smaller than a height transversal size of a box-shaped body of the first spacer.

12. Device according to claim 1, wherein said pair of retaining elements or hooks and said pair of slots are removable from the pair of adjacent spacers.

13. Device according to claim 12, wherein the spacer has a box-shaped C-shaped body.

14. Device according to claim 1, wherein said pair of retaining elements or hooks and said pair of slots are made of a material different than the material of the remainder of the spacer.

15. The device according to claim 1, further comprising:
at least a supplying pipe for a supplying line of the digging tool on a drilling machine; and
at least a crosspiece connected to said at least one support branch, the crosspiece comprising a seat adapted to support the supplying pipes.

* * * * *